United States Patent [19]

Heck et al.

[11] Patent Number: 4,511,437

[45] Date of Patent: Apr. 16, 1985

[54] PROCESS FOR THE CONTINUOUS RECTIFICATION OF ALCOHOLIC FERMATES

[75] Inventors: Günter Heck, Wiesbaden; Aladar Lienerth, Kelkheim; Egon Malow, Hochheim am Main; Karl-Heinz Schwarz, Liederbach; Uwe Faust, Kelkheim, all of Fed. Rep. of Germany

[73] Assignee: Hoechst Aktiengesellschaft, Frankfurt am Main, Fed. Rep. of Germany

[21] Appl. No.: 439,269

[22] Filed: Nov. 4, 1982

[30] Foreign Application Priority Data

Nov. 4, 1981 [DE] Fed. Rep. of Germany ....... 3143734

[51] Int. Cl.³ ............................................. B01D 3/38
[52] U.S. Cl. ...................................... 203/19; 203/77; 203/79; 203/80; 203/83; 203/85; 203/96; 435/161; 568/916
[58] Field of Search .................... 203/19, 18, DIG. 13, 203/71–85, 96; 202/172–174; 568/916; 426/494; 435/161

[56] References Cited

U.S. PATENT DOCUMENTS

| | | |
|---|---|---|
| 2,181,731 | 11/1939 | Hinckley . |
| 3,179,159 | 4/1965 | Jafs . |
| 3,259,553 | 7/1966 | Halbritter ............................. 203/19 |
| 3,303,106 | 2/1967 | Standiford . |
| 3,428,107 | 2/1969 | Backteman . |
| 3,926,739 | 12/1975 | Izumi . |
| 4,305,790 | 12/1981 | Kramer, Sr. . |
| 4,346,113 | 8/1982 | Faust et al. . |
| 4,358,536 | 11/1982 | Thorsson et al. . |

FOREIGN PATENT DOCUMENTS 2156765 1/1973 France .

OTHER PUBLICATIONS

Weiss, Moglichkeiten zur Energieeinsparung bei der Destillation, 32 Chem. Techn. 448–451, Sep. 1980.

*Primary Examiner*—Frank Sever
*Attorney, Agent, or Firm*—Curtis, Morris & Safford

[57] ABSTRACT

A process for continuous rectification of a liquid mixture containing alcohols, particularly a liquid fermate, employs a plurality of distillation columns to which the liquid mixture is fed in parallel, and which have successively reduced operating pressures and temperatures from an initial one to a final one thereof. The top vapor distillate from the higher-pressure columns supplies driving heat to the sumps of the next successively lower-pressure columns. Direct steam at 130° C. to 160° C. is fed to the sump of the column operated at the highest pressure. Direct steam is generated by indirect heat exchange of water with the top vapor withdrawn from the columns, and the resulting direct steam is fed to the sumps of the next-lower-pressure columns. The apparatus can also include a section for the production of absolute alcohol.

4 Claims, 4 Drawing Figures

PROCESS FOR THE CONTINUOUS RECTIFICATION OF ALCOHOLIC FERMATES

The invention relates to a process for the continuous rectification of alcoholic fermates which have been substantially or completely freed from suspended substances, such as is produced in fermentation of a substrate containing carbohydrates.

Numerous processes for the rectification of ethanol from aqueous liquid mixtures have already been described. Rising energy costs have directed attention in this matter increasingly towards processes in which there is an increase in economy, compared with conventional distillation processes, as a result of better utilization of the heat energy, in most cases supplied in the form of steam. Rectification processes have already been described in which alcohol-water mixtures are separated by a two-fold utilization of the energy, using two columns at different pressures. In these processes, the vapor top product of the first column is used to heat the downstream second column. By this means savings of energy of about 40 to 50% compared with known distillation processes have become possible, but, on the other hand, additional capital expenditure is also required as a result of the second distillation column [c.f. S. Weiss, Chem. Techn., Issue 32, 448 et seq. (1980)].

The development of economical processes for the continuous rectification of liquids containing alcohols is of course of great importance, above all for the separation of ethanol-water mixtures. Since mixtures of this type are frequently produced by the fermentation of a substrate containing carbohydrates and since the fermented mash drawn off from the fermentation vessel still contains appreciable quantities of dissolved organic and inorganic substances, such as yeast residues, proteins and nutrient salts, additional chemical engineering problems arise from this fact. Above all, care must be taken that deposits of solids which, after a short running time, would make it necessary to clean the equipment, are not formed in the distillation columns and in the remainder of the apparatus.

According to U.S. Pat. No. 4,358,536, a process for the production of ethanol requires that the yeast residues are first removed by centrifuging from the liquid withdrawn from the fermentation vessel, and the yeast-free phase is then fed into a simple evaporator. In this evaporator, the liquid is partially separated into an ethanol-rich first vapor phase, which is fed to a distillation column, and partially into a first liquid bottom phase. Since this separation procedure is associated with an appreciable consumption of energy, consideration has already been given to the possibility of removing the suspended substances from the fermented mash by a cheaper process step.

The object of this invention, therefore, is to achieve further savings of energy in the rectification of a liquid mixture containing alcohols and, for the production of ethanol from a fermented mash which has been substantially or completely freed from suspended substances, to do so without forming deposits of solids as yeast residues, proteins, and nutrient salts in the distillation columns or in the remainder of the apparatus.

This invention relates to a process for the continuous rectification of alcoholic fermates which is carried out by feeding said fermates in parallel flow into a plurality of heated distillation columns having successively reduced pressures from an initial column to a last column thereof, each such column having an associated sump, and withdrawing top vapor from the top of each column and using the heat from said top vapor to furnish part of the energy for rectification in the next following one of the columns; the process comprises the improvement, for the purpose of maximizing energy usage and avoiding solids deposition from the fermates, of feeding direct steam having a temperature of 130° C. to 160° C. for direct heat exchange to the sump of said initial column; generating direct steam by indirect heat exchange of water with the top vapor withdrawn from the top of said initial column; and feeding the resulting direct steam for direct heat exchange to the sump of the next-lower-pressure column.

The content of suspended substances in the mash must previously have been reduced, for example in a separator, to less than 0.5% by weight, preferably to less than 0.1% by weight, in order to avoid the danger of obstructions in the plates, valves, sump boilers, and other parts of the equipment. It is possible to dispense with the use of a mash column, if a mash which has been substantially or completely freed from suspended substances.

Figure 1:
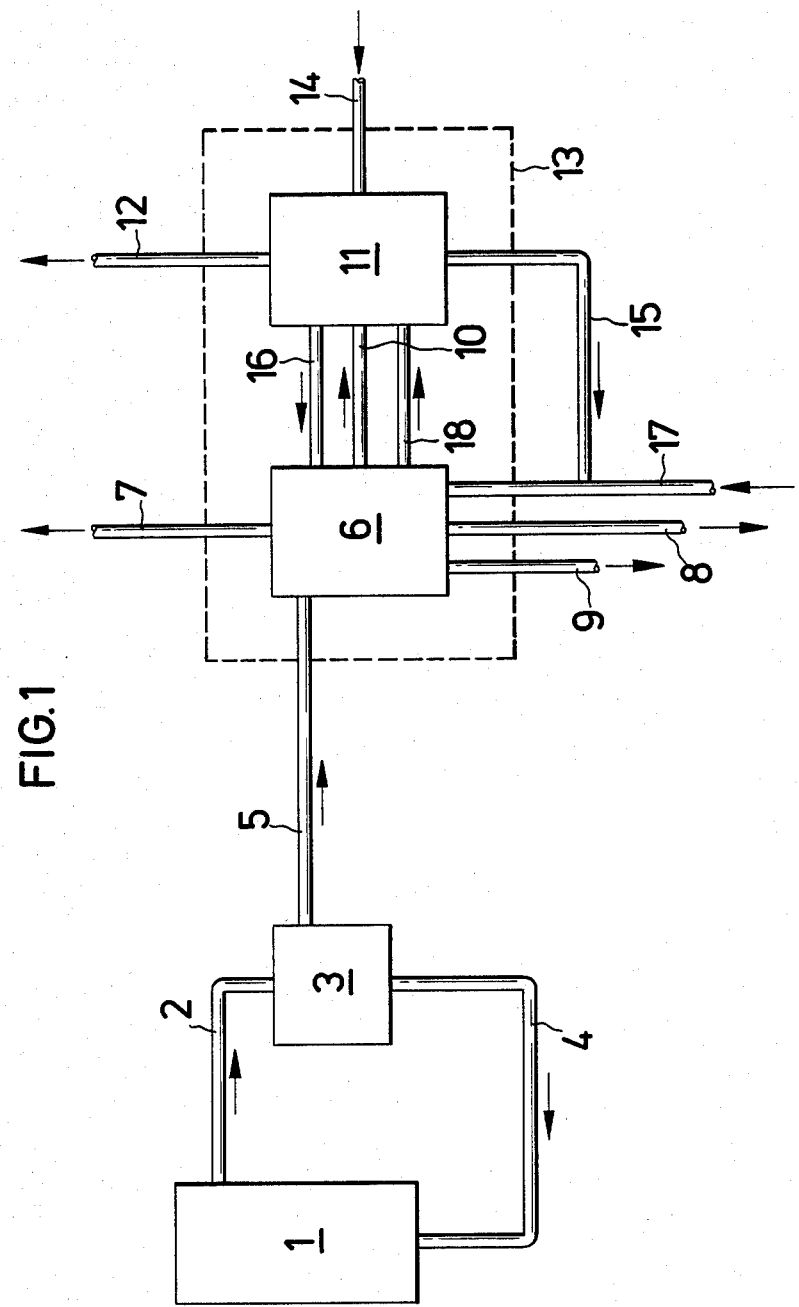
FIG. 1 is a flow diagram of a process for the continuous rectification of alcoholic fermates.

FIG. 1 shows a flow diagram of a process for the continuous rectification of alcoholic fermates. The fermented mash flows from the fermenter (1) via the lines (2) to the gravity separator (3), in which the flocculating, bottom-fermenting yeast settles out rapidly and is recycled to the fermenter (1) as a solids-rich phase through line (4). The clear phase of low solids content formed in the upper part of the separator (3) is then fed through line (5) to the section for the concentration of alcohol (6), where approximately 94% strength by weight ethanol is first obtained in a multi-stage distillation process. At the same time, low-boilers are removed here via line (7), fusel oils via line (8) and the spent wash, which contains less than 1,000 ppm by weight of alcohol, via line (9).

The ethanol obtained in the concentration plant now flows via the line (10) to a single-stage or multi-stage section (11) for the production of absolute alcohol, is dehydrated there by azeotropic distillation to a strength of more than 99.5% by weight, and is discharged via the line 12.

The heat energy required for the rectification process is supplied to the whole plant (13) comprising the section for the concentration of alcohol (6) and the section for the production of absolute alcohol (11), in the form of steam for heating, through the line (14); it should have a temperature between 150° and 230° C. The heat energy of the steam for heating is first used to operate the distillation columns of the section (11) for the production of absolute alcohol. The heating steam condensate produced is mixed via the line (15) with the boiler feed water in line (17) and is employed for the production of direct steam for the concentration section. The energy required for this is obtained by means of heat exchangers, not shown in the drawing, from the top vapor, removed via output line (16) of the section for the production of absolute alcohol. The cooled top vapor condensate is then recycled via (18) into the section (11) for the production of absolute alcohol.

Figure 2:
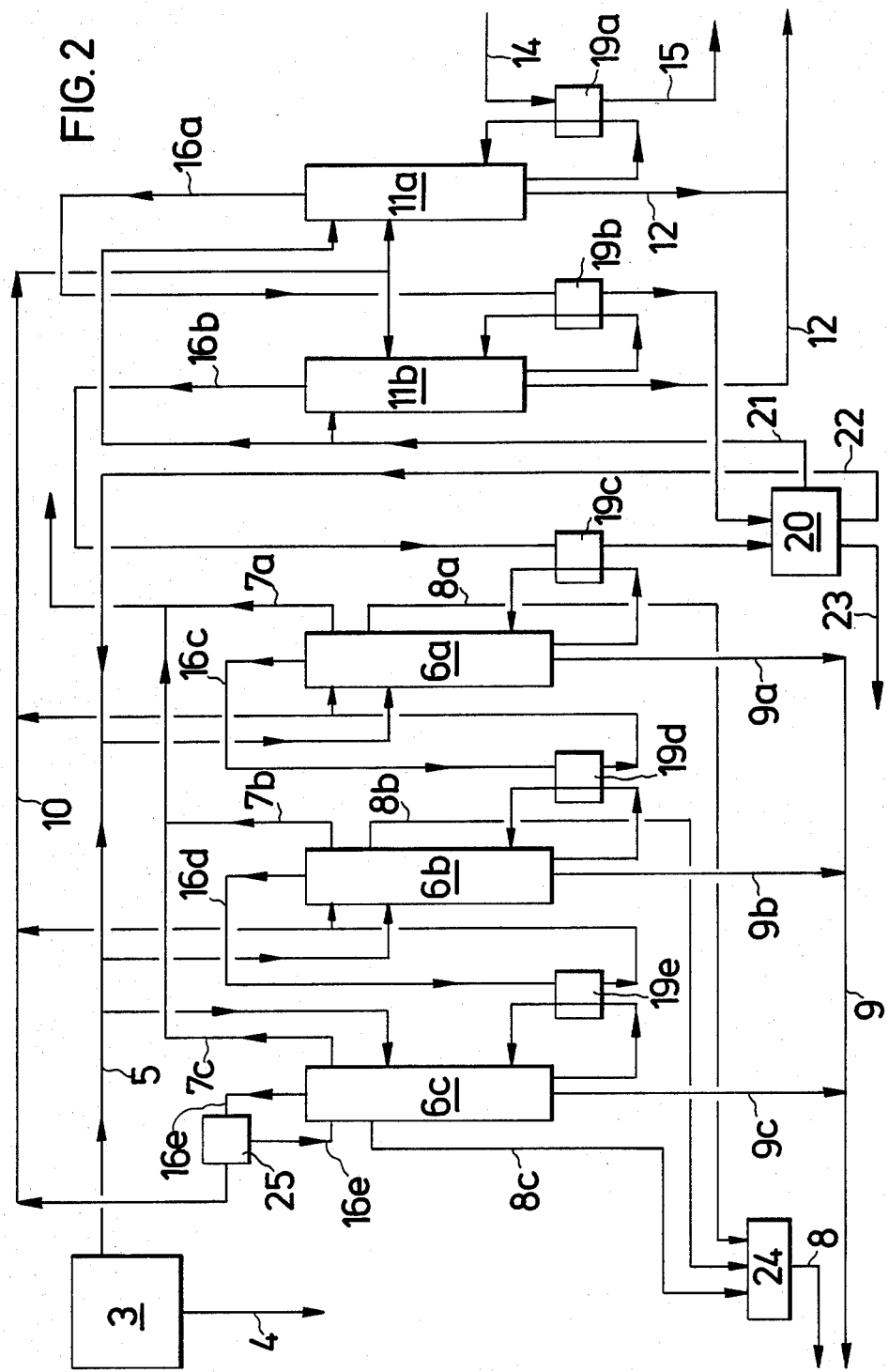
FIG. 2 is a block diagram of an embodiment of apparatus for carrying out a rectification process.

FIG. 2 shows the arrangement of a plant for carrying out a rectification process as generally shown and discussed in U.S. Pat. No. 3,259,553. The section for the concentration of alcohol (6) is represented here by three distillation columns (6a, 6b and 6c), connected in tandem, and the section for the production of absolute alcohol is represented by the columns (11a) and (11b). While the clear phase is distributed in parallel by means of the line (5) to the distillation columns of the section for the concentration of alcohol (6a) to (6c), a corresponding parallel distribution of the approximately 94% strength by weight ethanol obtained here to the columns (11a) and (11b) of the plant for the production of absolute alcohol takes place by means of the line (10). The use of sump boilers (19a) to (19e) is characteristic of the process shown in FIG. 2. In these sump boilers, the energy of the hot top vapor is fed to the sump boilers via the lines (16a) to (16d) and is transferred there to a stream of liquid which has been withdrawn from the sump of the distillation columns and is then recycled to the latter. With this mode of operation it is not possible to exclude the possibility that deposits will form, above all in the sump boilers, in the course of prolonged periods of continuous operation.

It can also be seen from FIG. 2 that the top vapor condensate of columns (11a) and (11b), which is composed of an azeotropic mixture of ethanol, water and a water-insoluble liquid, such as benzene, toluene, cyclohexane, hexane or other substances known to be suitable for this purpose, is collected via the lines (16a) and (16b) in a separator (20), from which the organic phase (21) is removed and recycled to the section for the production of absolute alcohol, while the aqueous phase (22), which contains about 6% by weight of ethanol, is fed to the columns of the section for the concentration of alcohol. Any impurities which collect in the separator (20) can be discharged via the line (23).

Small quantities of low-boilers, such as methanol, acetaldehyde and ethyl acetate are, in addition, always formed in the fermentation of mash. They are removed via the lines (7a) to (7c).

The fusel oils produced in the distillation columns (6a) to (6c) are fed to the storage tank (24) via the lines (8a) to (8c). The spent wash, which is nearly alcohol-free, leaves the plant through the lines (9a) to (9c).

A stepwise decrease in pressure and temperature from one distillaton column to the next one following is characteristic of the rectification process described. The column (11a), which is the first to be reached by the heating steam, has the highest temperature and the highest pressure, which can be up to 20 bar. The dehydration is simplified thereby, since the water content of the azeotropic distillate rises appreciably when the pressure is increased.

By the time it enters the first column of the section for the concentration of alcohol (6a), the heating steam has been cooled down to temperatures of 130° to 160° C., so that the pressure existing in this column is only 3 to 4 bar, and this pressure finally decreases to 0.2 to 0.4 bar in the columns downstream. A temperature of only 70° to 80° C. can be observed in column (6c). As a result of these low values of pressure and temperature in column (6c) of the section for the concentration of alcohol, the risk of decomposition of protein products, which reach the distillation columns in small quantities together with the clear phase through the line (5), is reduced so greatly that no appreciably deposits are formed on the base of the distillation column or in the sump boiler. The top vapor leaving this last column passes via line (16e) to a condenser (25) and from there similarly to the collecting line (10).

Figure 3:
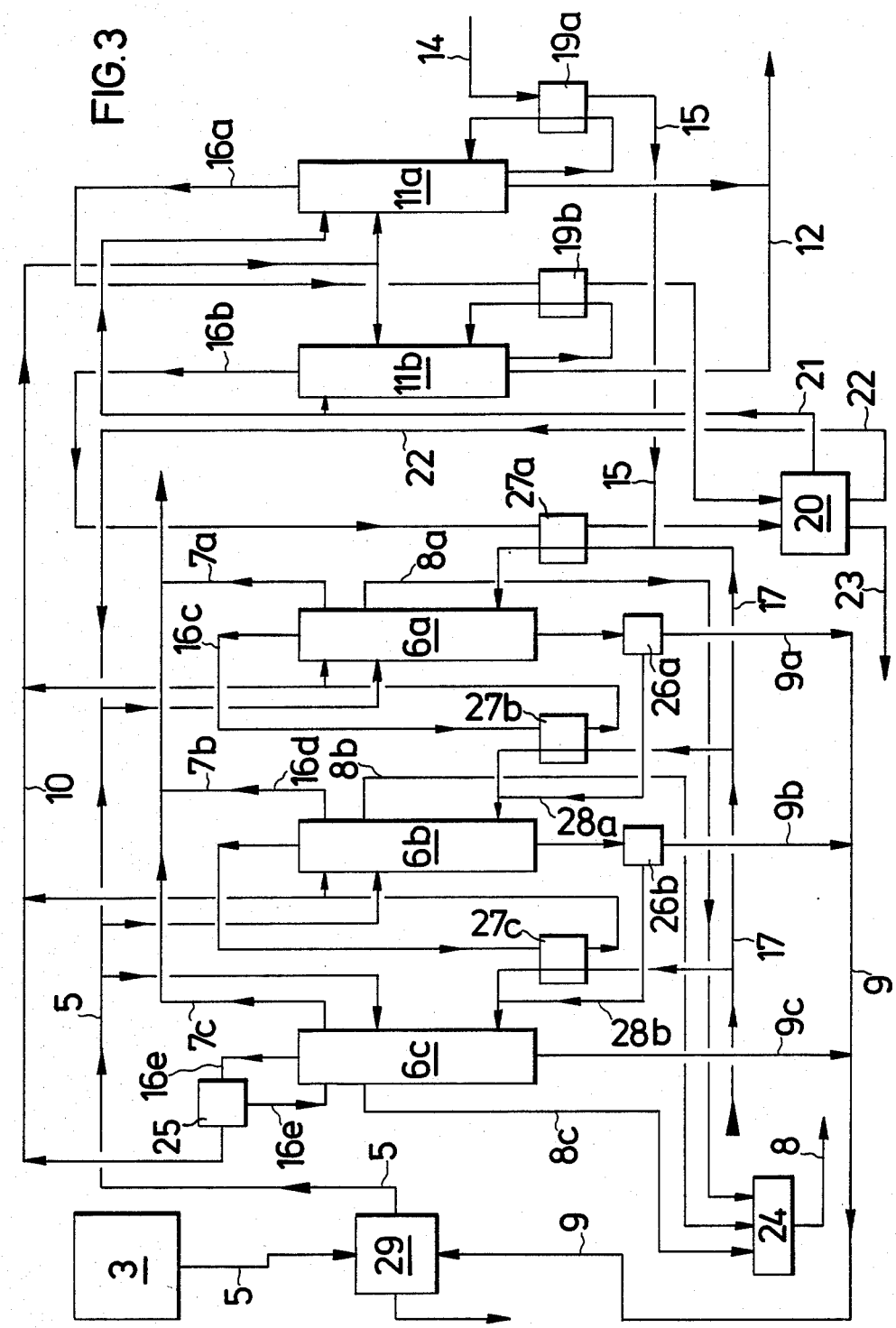
FIG. 3 is a flow diagram of the rectification process of this invention.

FIG. 3 illustrates the flow of the distillation process according to this invention. In this procedure, sump boilers are no longer used for the concentration of alcohol, but instead steam generators (27a) to (27c), which permit the production of direct steam, or live steam from the boiler feed water admitted via (17). The steam thus generated is introduced directly into the distillation columns, for direct contact with the contents of the columns, thereby making possible a particularly clean mode of operation, which, above all, makes it possible to prevent the contaminating constituents from being continually cycled through the heat. At the same time, the heat exchanger required is thus transferred into a region of lower temperature by the use of counter-current heat exchangers.

However, FIG. 3 also shows, additionally, how heat energy is utilized several times in the process according to the invention by using flash evaporators. This is, in fact, effected by introducing the spent wash discharged from the distillation columns (6a) and (6b) of the section for the concentration of alcohol into flash vessels (26a) and (26b), in which flash steam is recovered from the heated spent wash, and this steam, together with the direct steam obtained by means of a heat exchanger (27b) and (27c) from the top vapor of the same column, is fed, via the lines (28a) and (28b), to the stripping section of the column downstream.

Finally, a further utilization of energy is achieved by pumping the spent wash via line (9) into a heat exchanger (29), where it gives up its residual heat to the clear phase coming from the fermenter (3). It should be clear that section (11a, 11b) for the production of absolute (i.e. anhydrous) alcohol is not essential to this invention, and could be omitted.

Figure 4:
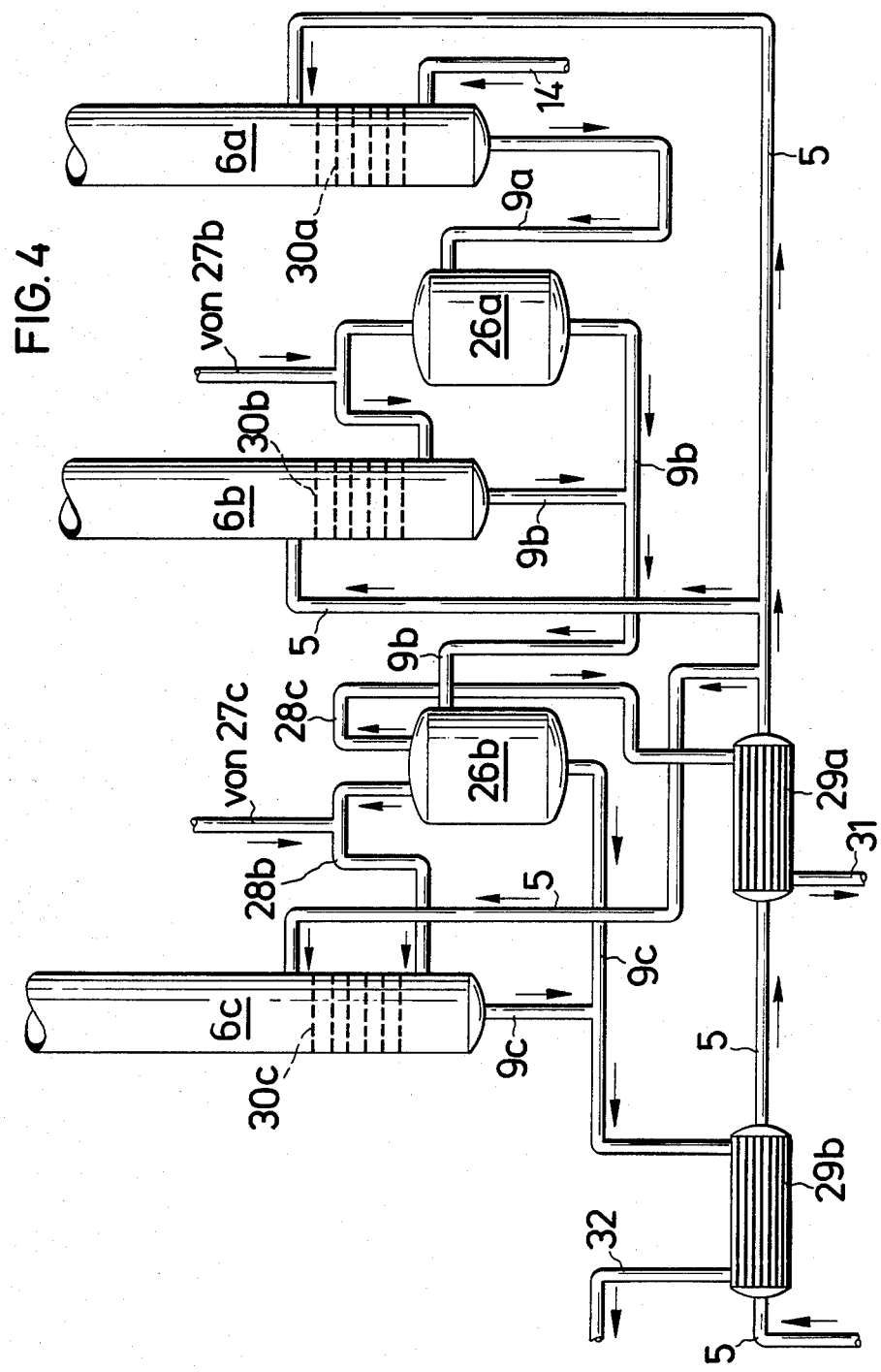
FIG. 4 illustrates a portion of the embodiment of FIG. 3.

The details of the process according to the invention are illustrated particularly clearly by means of FIG. 4. This shows the three distillation columns (6a), (6b) and (6c) which are connected in series and are operaated at three different levels of pressure. Perforated plates (30a) to (30c) the perforations of which should have a diameter not exceeding 20 mm and which are preferably coated with polytetrafluoroethylene, can be seen in the interior of the distillation columns. The heated spent wash is withdrawn from column (6a) via the sump and is passed to the flash evaporator (26a). Flash evaporation here provides steam which is also used for the heating of column (6b). However, the bulk of the heat energy required is, of course, provided by the heating steam obtained from the top vapor of column (6a). The spent wash leaving the flash evaporator (26a) is mixed with the spent wash discharged from the sump of column (6b), which has a correspondingly lower temperature, and the mixture is subjected to a further flash evaporation process in the flash evaporator (26b). The steam energy thus obtained is used for the direct heating of column (6c), but is also used in part in heat exchanger (29a) for preheating the clear phase of the mash. The condensed steam is then discharged via the line (31). The spent wash discharged from the flash evaporator (26b) is mixed with the spent wash of column (6c) and is also used to preheat the clear phase of the mash in the heat exchanger (29b). The steam obtained in the flash evaporator (26b) is fed partly via line (28b) into column (6c) and partly via line (28c) into the heat exchanger (29a). The spent wash, which has a low alcohol content, is then discharged via line (32).

The process described can be varied in numerous ways. For example, it is in no way always necessary for a stage (11) for the production of absolute alcohol additionally to follow the stage (6) for the concentration of alcohol. If completely anhydrous alcohol is not required, it is only necessary to operate the section of the apparatus used for the concentration of alcohol. In this case the heating steam is fed directly to that distillation column of the section for the concentration of alcohol (6a) which has the highest pressure.

The utilization of the heat energy of the heating steam is the more complete, the more distillation columns, linked in tandem, are provided. Against this improved utilization of energy, however, must be set higher capital expenditure arising from the installation of additional columns. Particularly advantageous results are obtained in the process according to the invention if three distillation columns linked in tandem are employed in the section for the concentration of alcohol (6) and two columns linked in series are employed in the section (11) for the production of absolute alcohol. The utilization of energy in the process described is so good that further columns do not bring any substantial further improvement in the energy efficiency. Whereas in the case of conventional process for the rectification of ethanol not having repeated utilization of steam energy by the multi-effect principle, 4 to 4.5 kg of steam are consumed per liter of absolute alcohol, and, in the case of two-fold utilization of steam in two columns linked in tandem, about 2.5 kg of steam are still required per liter of absolute alcohol, a further considerable saving in energy is effected in the process according to the invention. Thus, if two columns are used in the section for the concentration of alcohol and one column in the section for the production of absolute alcohol, only about 1.5 kg of steam are used per liter of absolute alcohol, and, finally, if three columns are used in the section for the concentration of alcohol and two columns in the section for the production of absolute alcohol, only 0.9–1.0 kg of steam are used per liter of absolute alcohol.

The process according to the invention is, of course, of particular importance in separating a fermented mash obtained by fermentation. However, it can, of course, also be used for rectifying any other aqueous liquid mixture containing alcohols, it being also possible for the alcohols present to be methanol, propanol, isopropanol, butanol and/or acetone, besides ethanol.

The process is illustrated in greater detail by the following example:

EXAMPLE

A fermented mash containing 6–8% by weight of ethanol and having a temperature of 33° C. is withdrawn from a fermenter and passed into a gravity separator. After a dwell time of about 15 minutes, the clear phase formed in the upper section of the separator is passed to the distillation columns, while the bottom phase in the separator, which has a high content of suspended substances, is recycled to the fermenter. On its way to the columns, the clear phase is passed through several heat exchangers, so that it is already preheated when it reaches the distillation columns. Here it is distributed in parallel to three distillation columns of the section for the concentration of alcohol, which are operated by the process of feeding in direct steam as shown in FIG. 3. The top vapor of these heating columns is condensed in heat exchangers, the condensate formed containing 94% by weight of ethanol. The column at the highest pressure level is operated at 3.7 bar and a temperature of 143° C., the next column has a pressure of 1.1 bar and a temperature of 110° C., while the last column has a pressure level of 0.4 bar and a temperature of 75° C. The spent wash withdrawn from the columns is subjected to flash evaporation as shown in FIG. 4 and further steam energy is thus obtained.

The 94% strength by weight ethanol is then passed into the plant for the production of absolute alcohol and is distributed there in parallel to two columns. The steam available for operating the plant has a temperature of 212° C. and is fed via a sump boiler to the first column, which is operated at a pressure not exceeding 20 bar. An azeotropic mixture of ethanol, water and benzene is distilled off from the top of this column and gives up its energy, via a sump boiler, to the next column in the section for the production of absolute alcohol, while 99% strength by weight ethanol is discharged via the sump.

The azeotropic distillates are collected in a two-stage separator and the organic phase is recycled to the columns for the production of absolute alcohol, while the aqueous phase, containing about 6% by weight of ethanol, is fed to the columns for the concentration of alcohol. The consumption of energy resulting in this plant is 0.9 kg of steam per liter of absolute ethanol.

We claim:

1. In a process for the continuous rectification of alcoholic fermates which is carried out by feeding said fermates in parallel flow into a plurality of heated distillation columns having successively reduced pressures from an initial column to a last column thereof, each said column having an associated sump, and withdrawing top vapor from the top of each column and using the heat from said top vapor to furnish part of the energy for rectification in the next following one of said columns; the improvement which comprises, maximizing energy usage and avoiding solids deposition from the fermates by, feeding direct steam having a temperature of 130° C. to 160° C. for direct heat exchange to the sump of said initial column; generating direct steam by indirect heat exchange of water with the top vapor withdrawn from the top of said initial column; and feeding the resulting direct steam for direct heat exchange to the sump of the next-lower-pressure column.

2. Process for rectification according to claim 1, further comprising feeding spent wash from at least one said column to a flash vessel for generation of steam at a lower pressure, and feeding said steam, with the direct steam produced by indirect heat exchange with the top vapor, to the sump of the next-lower-pressure column.

3. Process for rectification according to claim 2, further comprising feeding a portion of the steam from the flash vessel associated with one said column to a heat exchanger, and preheating therewith the alcoholic fermates fed to said distillation columns.

4. Process for rectification according to claim 1, further comprising flowing spent wash from said columns through a heat exchanger, and preheating therewith the alcoholic fermates fed to said distillation columns.

* * * * *